Dec. 4, 1923.

R. H. HASSLER

SHOCK ABSORBER

Filed May 25, 1922

1,476,609

2 Sheets-Sheet 1

INVENTOR
Robert H. Hassler,
By Raymond F. Buckley.
ATTORNEY

Dec. 4, 1923.

R. H. HASSLER

SHOCK ABSORBER

Filed May 25, 1922 — 2 Sheets-Sheet 2

1,476,609

INVENTOR
Robert H. Hassler,
BY Raymond F. Buckley
ATTORNEY

Patented Dec. 4, 1923.

1,476,609

UNITED STATES PATENT OFFICE.

ROBERT H. HASSLER, OF INDIANAPOLIS, INDIANA.

SHOCK ABSORBER.

Application filed May 25, 1922. Serial No. 563,538.

*To all whom it may concern:*

Be it known that I, ROBERT H. HASSLER, a citizen of the United States, residing at Indianapolis, in the county of Marion and State of Indiana, have invented certain new and useful Improvements in Shock Absorbers, of which the following is a specification.

My invention relates to that class of shock absorbing devices in which friction is employed to restrain and dampen the natural oscillatory movements of the vehicle springs; and one of the objects of the invention is to provide simple and practical improvements in friction shock absorbers whereby high efficiency is attained, construction is simplified and unusual compactness of design is secured without a multiplicity of parts to wear loose and rattle.

A further and very important object of the invention is to provide an enclosed construction whereby all forms of road dirt and other foreign matter are effectually excluded from the internal parts of the device.

A still further object of the invention consists in the provision of means for setting up and maintaining a predetermined friction pressure between the moving parts of the device, this pressure being properly adjusted when the device is assembled.

The enclosed construction is of a "fool proof" nature and prevents any tampering with the correct predetermined friction pressure.

Still another advantage lies in the fact that the heat incident to the friction is generated in a manner to be most readily and efficiently dissipated. With other forms of friction shock absorbers the parts operate in such a manner that some or all of the heat is generated on the inner surfaces where the parts are more or less inaccessible to air cooling. In the present device, however, provision is made so that the heat generated by the friction will be immediately inside the outer walls where it is most readily dissipated.

The distinguishing features of my invention will be further elucidated and the important structural elements characterizing the practical embodiment which is illustrated as an example, will be more particularly explained in the specifications described hereinafter to be given, in which:—

Figure 1:
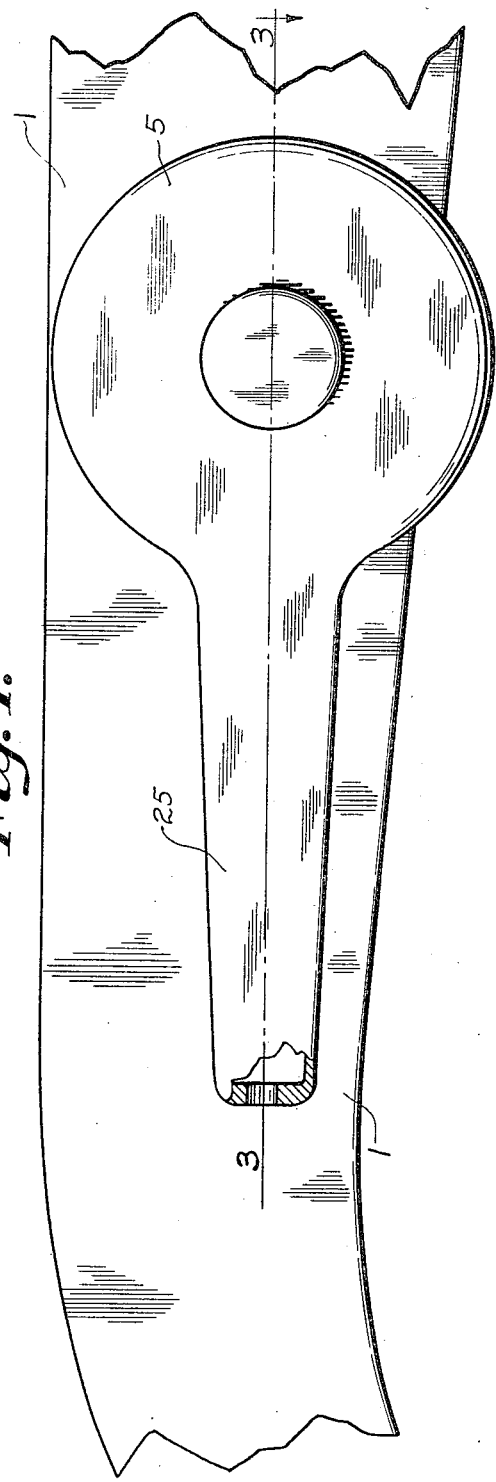
Figure 2:
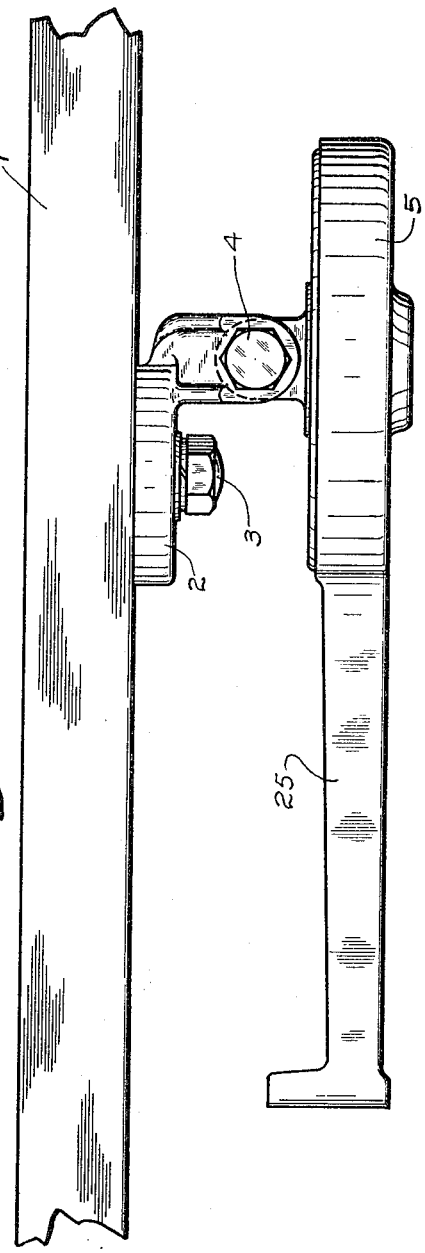
Figure 3:
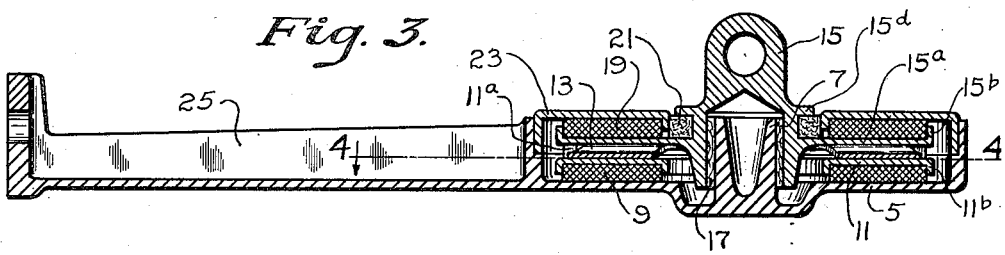
Figure 5:
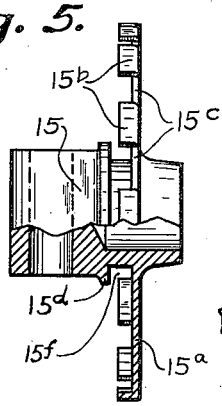
Figure 4:
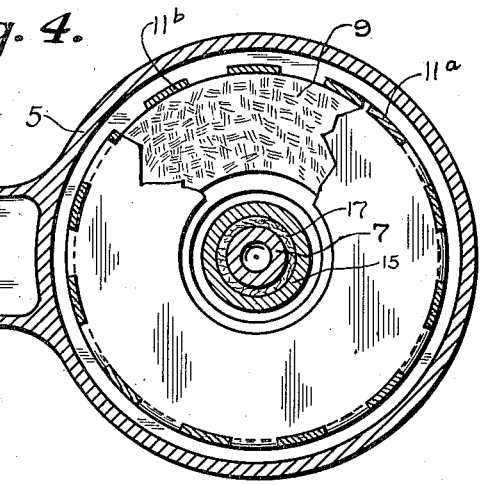
Figure 8:
Figure 6:
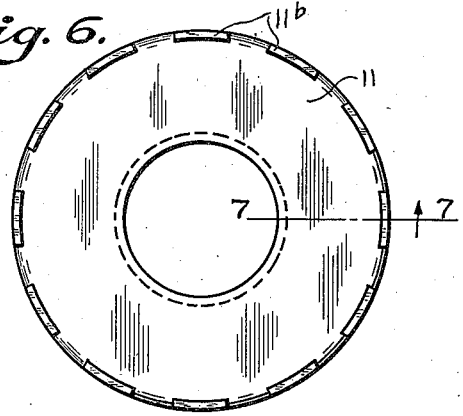
Figure 9:
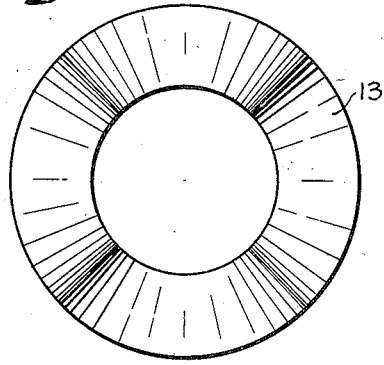
Figure 7:
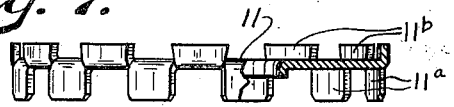

Figure 1 is a side elevation of my improved friction shock absorber shown as occupying an operative position. Fig. 2 is a plan view of the friction device also shown in operative position. Fig. 3 is a horizontal section on the line 3—3 in Fig. 1. Fig. 4 is a fragmentary cross section of the device on the line 4—4 in Fig. 3 showing some of the working parts therein. Fig. 5 is a view of the center support or hub member, shown in elevation, with a fragment broken away and shown in section. Fig. 6 is a plan view of the outer friction disk container. Fig. 7 is a side view thereof with a fragment in section taken on line 7—7 in Fig. 6. Fig. 8 is an elevation of the compression spring, and Fig. 9 is a plan view thereof.

Referring to the drawings, the shock absorber embodying my invention is shown as applied to an automobile, 1 designating a portion of the frame element thereof, and 2 a frame bracket secured to the frame by a bolt 3. The shock absorber is pivotally mounted on the frame bracket by bolt 4.

The center support or hub member 15 of the shock absorber contains a flanged portion or disk container $15^a$, from the outer periphery of which project a plurality of out-turned lips or keys $15^b$, and the spaces between these lips form a plurality of grooves $15^c$. This hub member also contains at the base of the flange an annular recess or groove $15^f$. 17 is a cylindrical bush pressed into the center opening of the hub member 15 forming a journal or bearing. Into disk container $15^a$ is pressed and securely held the friction disk 19. Disk 19 is non-rotatable in relation to its container $15^a$. 11 is a second disk container or flange containing on its periphery a plurality of lips or keys $11^a$. These keys $11^a$ fit loosely into the spaces $15^c$ so that the two containers can move axially with relation to one another, but are locked circumferentially with relation to one another. 9 is a second friction disk securely pressed into container 11 and held so as to be non-rotatable therein by the lips $11^b$. Interposed between container $15^a$ and container 11 is an annular spring 13 in a condition of compression, tending to press the two containers in an axial direction away from one another. 5 is an outer oscillating member containing a central shaft 7 engaging in the bush 17 and forming a pivot bearing therein. 25 is an actuator arm formed integral with the oscillating member 5 and connected to the opposing vehicle member through a suitable mechanical connection that will set up oscillations when the frame and axle elements of the vehicle approach or separate.

23 is a hollow cup-shaped cover securely held in the oscillating member 5 by being tightly pressed in. 21 is an annular felt washer lying in the groove $15^t$ of the hub member 15, this groove being formed between the base of the disk container $15^a$ and the small hub flange $15^d$.

The operation of the parts will now be described. Spring 13 sets up a central internal pressure transmitted through the containers $15^a$ and 11 to the friction disks 19 and 9 respectively. The friction disks 19 and 9 bear against the inner annular surfaces of 23 and 5 respectively and thus set up frictional resistance or damping effect to all oscillations. The disks cannot slide in their containers, but are forced to slide upon the inner surfaces of the outer casing only. For this reason, the heat is generated only in the outer walls of the device and no heat is generated internally. This concentration of heat in the outer walls where it is most susceptible of dissipation by air cooling is a great advantage as it helps materially to keep down the temperature of the device when it is worked hard. Parts 5 and 23, when assembled about the disk, form a protecting casing which is almost complete with the exception of the space in the inside diameter of part 23. This space is filled by the supporting hub member 15 with its hub flange $15^d$ and felt washer 21. By making the flange $15^d$ almost as large in diameter as the inner diameter of cover 23, the felt washer itself can be protected from mechanical damage and is inaccessible to road dirt, water and other foreign matter except through the small opening left between the outside of flange $15^d$ and the inside of cover 23. The fact that this one opening or circular joint is of small diameter in relation to the total size of the device is a big advantage as compared to any construction where the crevice or joint is of large diameter near the outer periphery of the device.

Cover 23 is of course pressed into member 5 when the device is assembled under a much heavier pressure than that exerted by the compression spring 13, so that the two halves of the casing will at all times stay together in the position into which they have been pressed. This construction also affords a smooth neat exterior of the casing.

After the device is assembled in manufacture, no adjustments of the friction are possible from the outside as the compression spring is inaccessible. A very efficient spring pressure is obtained by using the flat annular spring 13, more clearly illustrated in Figs. 8 and 9 of the drawings, by placing it between the disks 9 and 19, the spring being of approximately the same diameter as the disks. This arrangement not only affords great spring efficiency, but also gives a very compact arrangement of the various parts.

The wear on the felt washer and adjacent parts due to the oscillating action of the device will be small where the felt washer with its exposed joint is of small diameter, as compared to the wear at a joint of large diameter. The small diameter joint therefore is a decided help in excluding road grit and other objectionable foreign matter. The entrance of water and dirt to the frictional surfaces causes a very erratic and unsatisfactory action of this type of shock absorbers, and this fault is reduced to a minimum by my improved form of casing which is almost complete and continuous around the working parts except for the one joint which is of small diameter.

It is obvious that many modifications and changes may be made in my invention without departing from the spirit thereof, and I do not mean to limit myself to the exact construction shown and described.

What I claim and desire to secure by Letters Patent is—

1. A shock absorber for vehicle springs comprising in combination, a casing, friction discs disposed within the casing in oscillatory frictional relation therewith, a hub member concentric with the axis of oscillatory movement and projecting through one side of the casing, means for rigidly connecting the friction discs with said hub member, means for rigidly connecting the hub externally to a vehicle frame element, and an actuator arm rigidly connected to said casing.

2. A shock absorber for vehicle springs comprising in combination, a casing, friction discs disposed within the casing in oscillatory frictional relation therewith, a hub member concentric with the axis of oscillatory movement and projecting through one side of the casing, means for rigidly connecting the friction discs with said hub member, means for rigidly connecting the hub externally to a vehicle frame element, and an actuator arm integral with said casing.

3. A shock absorber for vehicle springs comprising in combination, a casing, friction discs disposed within the casing in oscillatory frictional relation therewith, an expanded hub member concentric with the axis of oscillatory movement and projecting through one side of the casing, means for rigidly connecting the friction discs with said hub member, means for rigidly connecting the hub externally to a vehicle frame element, and an actuator arm rigidly connected to said casing.

4. A shock absorber for vehicle springs comprising in combination, a casing, friction discs disposed within the casing in oscillatory frictional relation therewith, a hub member concentric with the axis of oscillatory movement and projecting through one side of the casing, a second hub member formed on the casing and mating with said first mentioned hub member, whereby said hub members mutually support and guide one another, means for rigidly connecting the first mentioned hub member internally with the friction discs, and means for producing relative oscillatory movement between said casing and said first mentioned hub member.

5. A shock absorber for vehicle springs comprising in combination, a casing, friction discs disposed within the casing in oscillatory frictional relation therewith, a hub member concentric with the axis of oscillatory movement and projecting through one side of the casing, a second hub member carried by the casing and mating with said first mentioned hub member, whereby said hub members mutually support and guide one another, means for rigidly connecting the first mentioned hub member internally with the friction discs and externally with the vehicle frame element, and an actuator arm rigidly connected to said casing.

6. A shock absorber for vehicle springs comprising in combination, a casing, friction discs disposed within the casing in oscillatory frictional relation therewith, a hub member concentric with the axis of oscillatory movement and projecting through one side of of the casing, a second hub member formed on the casing and mating within said first mentioned hub member, whereby said hub members mutually support and guide one another, means for rigidly connecting the first mentioned hub member internally with the friction discs, and means for producing relative oscillatory movement between said casing and said first mentioned hub member.

7. A shock absorber for vehicle springs comprising in combination, a casing, friction discs disposed within the casing in oscillatory frictional relation therewith, a hub member concentric with the axis of oscillatory movement and projecting through one side of the casing, a flange carried by said hub member and provided with means for non-rotatively holding one of said friction discs, a floating disc container provided with means for non-rotatively holding another friction disc, means for locking said flange and said floating disc container together with respect to rotative movement, and means for producing relative oscillatory movement between the casing and the hub member.

8. A shock absorber for vehicle springs comprising in combination, a casing, friction discs disposed within the casing in oscillatory frictional relation therewith, a hub member concentric with the axis of oscillatory movement and projecting through one side of the casing, a flange carried by said hub member and provided with means for non-rotatively holding one of said friction discs, a floating disc container provided with means for non-rotatively holding another friction disc, compression springs between said flange and said floating disc container, interengaging members carried by the flange and container respectively for locking the flange and container together with respect to oscillatory movement but permitting relative axial movement of said flange and container.

In witness whereof I have hereunto set my hand and seal at Indianapolis, Indiana, this 18th day of May, A. D., one thousand nine hundred and twenty-two.

ROBERT H. HASSLER. [L. S.]